United States Patent
Sogabe

(10) Patent No.: US 11,946,900 B2
(45) Date of Patent: Apr. 2, 2024

(54) ELECTROPHORESIS FLOW CHANNEL CLEANING METHOD AND ELECTROPHORESIS DEVICE

(71) Applicant: Shimadzu Corporation, Kyoto (JP)

(72) Inventor: Yuji Sogabe, Kyoto (JP)

(73) Assignee: Shimadzu Corporation, Kyoto-shi (JP)

( * ) Notice: Subject to any disclaimer, the term of this patent is extended or adjusted under 35 U.S.C. 154(b) by 391 days.

(21) Appl. No.: 15/948,413

(22) Filed: Apr. 9, 2018

(65) Prior Publication Data
US 2019/0310226 A1 Oct. 10, 2019

(51) Int. Cl.
| | |
|---|---|
| G01N 27/447 | (2006.01) |
| B08B 3/04 | (2006.01) |
| B08B 3/10 | (2006.01) |
| B08B 9/027 | (2006.01) |
| B08B 3/08 | (2006.01) |

(52) U.S. Cl.
CPC ....... *G01N 27/44704* (2013.01); *B08B 9/027* (2013.01); *G01N 27/44791* (2013.01); *B08B 3/04* (2013.01); *B08B 3/08* (2013.01); *B08B 3/10* (2013.01)

(58) Field of Classification Search
CPC ....... G01N 27/44704; G01N 27/44791; G01N 27/447; G01N 27/44713; G01N 27/44726; G01N 27/4473; G01N 27/44743–44747; B08B 9/027; B08B 3/04; B08B 3/08; B08B 9/032; B08B 3/10; B01L 3/5027; B01L 2400/0421
USPC .......................................................... 204/451
See application file for complete search history.

(56) References Cited

U.S. PATENT DOCUMENTS

| | | | | |
|---|---|---|---|---|
| 5,096,554 A | * | 3/1992 | Chin ................. | C12Q 1/68 204/451 |
| 5,264,101 A | * | 11/1993 | Demorest ........ | G01N 27/44752 204/452 |
| 5,290,418 A | * | 3/1994 | Menchen ......... | G01N 27/44747 204/455 |

(Continued)

FOREIGN PATENT DOCUMENTS

| | | |
|---|---|---|
| JP | 2005-214710 | 8/2005 |
| JP | 2017-72408 | 4/2017 |

OTHER PUBLICATIONS

Zhu et al., Multiplexed fluorescence detection in microfabricated devices with both time-resolved and spectral-discrimination capabilities using near-infrared fluorescence, Analytical Biochemistry, vol. 330, pp. 206-218 (2004) (Year: 2004).*

(Continued)

*Primary Examiner* — Joshua L Allen
*Assistant Examiner* — Vivian A Tran
(74) *Attorney, Agent, or Firm* — Oblon, McClelland, Maier & Neustadt, L.L.P.

(57) ABSTRACT

A polymer not including a fluorescent dye is introduced into an electrophoresis flow channel and electrophoresis is performed (Steps S101, S103), so that a fluorescent dye in the electrophoresis flow channel is removed from the inside of the electrophoresis flow channel by the polymer. The fluorescent dye accumulated in the electrophoresis flow channel can be adhered to the polymer having a certain viscosity and removed from the electrophoresis flow channel. Accordingly, separation performance of a flow channel member can be recovered effectively.

19 Claims, 3 Drawing Sheets

(56) References Cited

U.S. PATENT DOCUMENTS

| | | | | |
|---|---|---|---|---|
| 5,567,292 A | * | 10/1996 | Madabhushi | G01N 27/44747 |
| | | | | 204/451 |
| 5,759,369 A | * | 6/1998 | Menchen | G01N 27/44747 |
| | | | | 204/450 |
| 5,843,680 A | * | 12/1998 | Manian | G01N 33/561 |
| | | | | 435/7.4 |
| 2005/0161402 A1 | | 7/2005 | Hanafusa et al. | |
| 2011/0132761 A1 | * | 6/2011 | Yang | G01N 33/582 |
| | | | | 204/451 |

OTHER PUBLICATIONS

Nirode et al., On-Column Surface-Enhanced Raman Spectroscopy Detection in Capillary Electrophoresis Using Running Buffers Containing Silver Colloidal Solutions, Analytical Chemistry, vol. 72, No. 8, pp. 1866-1871 (2000) (Year: 2000).*

* cited by examiner

ELECTROPHORESIS FLOW CHANNEL CLEANING METHOD AND ELECTROPHORESIS DEVICE

BACKGROUND OF THE INVENTION

Field of the Invention

The present invention relates to an electrophoresis flow channel cleaning method and an electrophoresis device for removing a fluorescent dye in an electrophoresis flow channel.

Description of the Related Art

When an analysis is made on a component deviated from an organism, such as a nucleic acid, a protein, a peptide, or a saccharide, an electrophoresis method is sometimes used to separate the component. For example, when an analysis is made on a trace of a DNA as a sample by amplifying a specific region of the DNA by using polymerase chain reaction (PCR), the electrophoresis method is a method essential for checking an amplification product of the amplification.

In the electrophoresis method, for example, an electrophoresis flow channel is filled with a polymer containing a fluorescent dye, and then a sample is introduced into the electrophoresis flow channel. At this time, with a voltage applied to the electrophoresis flow channel, the sample is electrophoresed in the electrophoresis flow channel. In this process, a component in the sample is separated. The component in the sample is marked by generation of a phenomenon (intercalation) where a fluorescent dye contained in the polymer is inserted into the component.

The component in the sample electrophoresed in the electrophoresis flow channel is marked by the fluorescent dye as described above. Accordingly, when irradiated with excitation light in a detector, the component is excited and emits fluorescence. Therefore, the detector receiving the fluorescence can detect the component in the sample (for example, see JP-A-2005-214710).

The polymer used herein means a separation buffer used for analysis in a microchip electrophoresis device.

SUMMARY OF THE INVENTION

In the electrophoresis device as described in JP-A-2005-214710, electrophoresis is performed by using a plate-like flow channel member (microchip) in which an electrophoresis flow channel is formed. In the electrophoresis method using such a microchip, the microchip can be used repeatedly. Accordingly, high-accuracy analysis can be performed with reduced running cost.

However, there arises a problem that repeated use of a microchip causes separation performance at the time of electrophoresis to be gradually lowered. The lowering speed of the separation performance is different depending on a state of a sample. When an analysis is made repeatedly by using a sample deviated from an organism, the separation performance tends to be lowered significantly as compared with the case where a standard sample and the like are used.

When a microchip is repeatedly used, a cleaning solution, such as water, is introduced into an electrophoresis flow channel, for example, every time an analysis is made, so that a next analysis is made after the electrophoresis flow channel is cleaned. In this manner, a component adsorbed to the inside of the electrophoresis flow channel is removed, and separation performance can be recovered for each analysis. However, even when such cleaning is repeated, the separation performance of the microchip is gradually lowered. For this reason, the microchip needs to be replaced regularly.

The cause of the gradual lowering of the separation performance of the microchip in spite of the above cleaning is conventionally considered as contamination to an unrecoverable state of the inside of the electrophoresis flow channel by a component in a sample, or a use limit of the microchip that is reached due to deterioration over time. However, there is a possibility that a fluorescent dye accumulated in the electrophoresis flow channel has an influence on lowering in the separation performance of the microchip.

The present invention is made in view of the above circumstances. An object of the present invention is to provide an electrophoresis flow channel cleaning method and an electrophoresis device that can effectively recover separation performance of a flow channel member.

An electrophoresis flow channel cleaning method according to the present invention includes a polymer introduction step and an electrophoresis step. In the polymer introduction step, a polymer not including a fluorescent dye is introduced into an electrophoresis flow channel. In the electrophoresis step, a voltage is applied to the electrophoresis flow channel filled with the polymer, so that a fluorescent dye in the electrophoresis flow channel is removed from the inside of the electrophoresis flow channel by the polymer.

According to the above configuration, the fluorescent dye accumulated in the electrophoresis flow channel can be removed by the polymer not including a fluorescent dye introduced into the electrophoresis flow channel. That is, the fluorescent dye accumulated in the electrophoresis flow channel can be removed from the inside of the electrophoresis flow channel by being adhered to the polymer having a certain viscosity. In this manner, the separation performance of the flow channel member can be recovered effectively as compared with the configuration where the inside of an electrophoresis flow channel is cleaned merely with a cleaning solution such as water.

The electrophoresis flow channel cleaning method may further include a sample introduction step and a fluorescence detection step. In the sample introduction step, a sample is introduced into the electrophoresis flow channel that is filled with the polymer by the polymer introduction step. In the fluorescence detection step, fluorescence from the sample electrophoresed by application of the voltage in the electrophoresis step to the electrophoresis flow channel into which the sample is introduced is detected.

According to the above configuration, the sample is introduced into the electrophoresis flow channel and electrophoresed in a state where the electrophoresis flow channel is filled with the polymer not including a fluorescent dye. At this time, if the fluorescent dye still remains in the electrophoresis flow channel, the fluorescent dye is inserted into a component in the sample introduced into the electrophoresis flow channel and the component is marked. Accordingly, by detecting fluorescence from the sample, existence of the fluorescent dye in the electrophoresis flow channel can be confirmed. In this manner, whether or not a fluorescent dye remains in the electrophoresis flow channel can be easily checked.

The electrophoresis flow channel cleaning method may further include a fluorescence determination step. In the fluorescence determination step, an amount of the fluorescence detected in the fluorescence detection step is compared with a threshold value. In this case, the polymer introduction step, the sample introduction step, and the electrophoresis step may be repeated until the amount of the fluorescence is determined to be smaller than the threshold value in the fluorescence determination step.

According to the above configuration, the fluorescence from the sample is detected, and the amount of the fluorescence is compared with the threshold value. In this manner, whether or not a certain amount or more of the fluorescent dye remains in the electrophoresis flow channel can be checked. The polymer not including a fluorescent dye is repeatedly introduced into the electrophoresis flow channel until the amount of the fluorescent dye existing in the electrophoresis flow channel becomes smaller than the certain amount. Accordingly, the fluorescent dye can be favorably removed from the electrophoresis flow channel.

An electrophoresis device according to the present invention includes a flow channel member, a polymer containing section, a polymer introduction control section, and an electrophoresis control section. In the flow channel member, an electrophoresis flow channel is formed. The polymer containing section contains a polymer not including a fluorescent dye. The polymer introduction control section introduces the polymer into the electrophoresis flow channel from the polymer containing section. The electrophoresis control section applies a voltage to the electrophoresis flow channel filled with the polymer, so that a fluorescent dye in the electrophoresis flow channel is removed from the inside of the electrophoresis flow channel by the polymer.

The electrophoresis device may further include a sample introduction control section and a fluorescence detection section. The sample introduction control section introduces a sample into the electrophoresis flow channel that is filled with the polymer by the polymer introduction control section. The fluorescence detection section detects fluorescence from the sample electrophoresed by application of the voltage by the electrophoresis control section to the electrophoresis flow channel into which the sample is introduced.

The electrophoresis device may further include a fluorescence determination section. The fluorescence determination section compares an amount of the fluorescence detected by the fluorescence detection section with a threshold value. In this case, the processing performed by the polymer introduction control section, the sample introduction control section, and the electrophoresis control section may be repeated until the amount of the fluorescence is determined to be smaller than the threshold value by the fluorescence determination section.

According to the present invention, a fluorescent dye accumulated in the electrophoresis flow channel can be adhered to a polymer having a certain viscosity to be removed from the electrophoresis flow channel. Accordingly, the separation performance of the flow channel member can be recovered effectively.

DETAILED DESCRIPTION OF THE PREFERRED EMBODIMENTS

Figure 1:
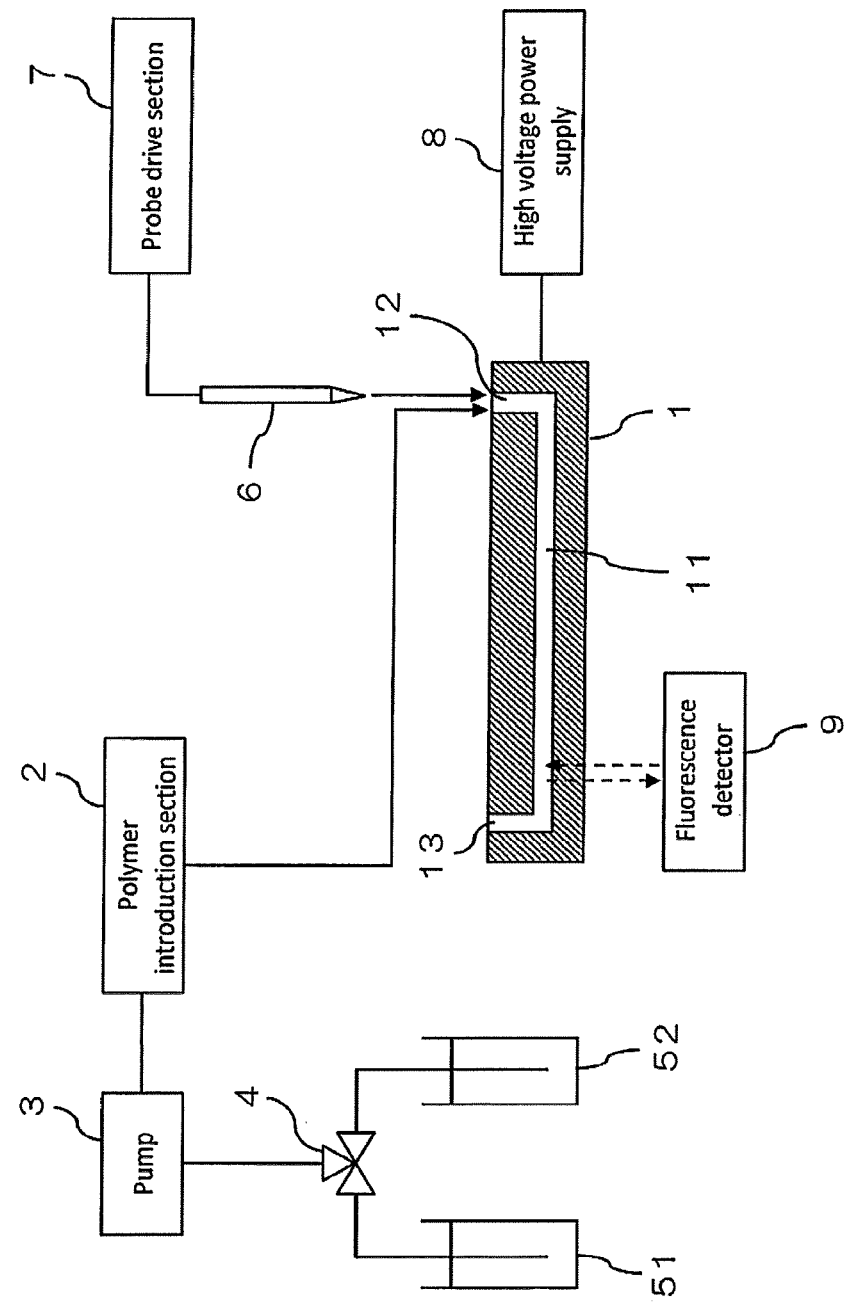
FIG. 1 is a schematic diagram showing a configuration example of an electrophoresis device according to an embodiment of the present invention.

FIG. 1 is a schematic diagram showing a configuration example of an electrophoresis device according to an embodiment of the present invention. The electrophoresis device according to the present embodiment is a microchip electrophoresis device that performs electrophoresis of a sample by using a microchip 1. The sample is a biopolymer, such as a protein, a nucleic acid, or a saccharide, and preferably has a high purity of 90% or higher. The electrophoresis device is provided with a polymer introduction section 2, a pump 3, a valve 4, polymer containing sections 51 and 52, a probe 6, a probe drive section 7, a high voltage power supply 8, a fluorescence detector 9 and the like, in addition to the microchip 1.

The microchip 1 is, for example, a plate-like flow channel member, and an electrophoresis flow channel 11 is formed inside of the microchip 1. On a surface of the microchip 1, an inflow port 12 and an outflow port 13 of the electrophoresis flow channel 11 are formed. The electrophoresis flow channel 11 having a curved shape that connects the inflow port 12 and the outflow port 13 is formed in the microchip 1. The microchip 1 may be provided with one or a plurality of the electrophoresis flow channels 11.

The polymer introduction section 2 includes a mechanism for introducing a polymer into the electrophoresis flow channel 11 from the inflow port 12. The polymer is put in the electrophoresis flow channel 11 to be used. In the present embodiment, a polymer for separation that includes a fluorescent dye and a polymer for cleaning that does not include a fluorescent dye are used as the polymer.

As the polymer for cleaning, a polymer which is cheaper than the polymer for separation can be used. Alternatively, a polymer of the same kind as the polymer for separation may be used in a state of not including a fluorescent dye. A derivatized cellulose, such as a carboxymethyl cellulose, hydroxypropyl cellulose, or hydroxyethyl cellulose, is used as the polymer. A fluorescent reagent having a fluorescent wavelength of 500 to 650 nm is used as the fluorescent dye.

The polymer for separation including a fluorescent dye is contained in the polymer containing section 51. The polymer for cleaning not including a fluorescent dye is contained in the polymer containing section 52. The pump 3 is connected to the polymer containing sections 51 and 52 via the valve 4. By switching the valve 4, a polymer can be sucked from either one of the polymer containing sections 51 and 52 into the pump 3, and then introduced into the polymer introduction section 2. Alternatively, an existing electrophoresis device can also be used instead of providing the polymer containing section 52 exclusively used for containing the polymer for cleaning, as long as the electrophoresis device has a configuration of, for example, using a spare polymer containing section.

At the time of analysis, the polymer for separation contained in the polymer containing section 51 is introduced into the electrophoresis flow channel 11 from the polymer introduction section 2, and the electrophoresis flow channel 11 is filled with the polymer. In this state, a sample is introduced into the electrophoresis flow channel 11 from the probe 6, so that the sample is electrophoresed.

The probe drive section 7 includes a motor and a pump (both of which are not shown), and the like. When the probe drive section 7 is driven, the probe 6 is moved, and suction of a sample into the probe 6 and discharge of a sample from the probe 6 are performed. That is, when the probe drive section 7 is driven, the probe 6 is moved into a sample container (not shown), and a sample in the sample container is sucked into the probe 6. Thereafter, the probe 6 is moved to the inflow port 12 of the electrophoresis flow channel 11, and the sample is discharged from the inflow port 12 into the electrophoresis flow channel 11.

At this time, with a voltage applied from the high voltage power supply 8 to the microchip 1, the sample introduced into the electrophoresis flow channel 11 is electrophoresed in the electrophoresis flow channel 11 from the inflow port 12 side to the outflow port 13 side. A nucleic acid can be exemplified as the sample. However, the sample is not limited thereto, and may be a sample that includes any of other components such as a protein, a peptide, or a saccharide.

In a process of the electrophoresis of the sample in the electrophoresis flow channel 11, each component in the sample is separated, and a fluorescent dye included in the polymer for separation is inserted into each component so that each component is marked. The fluorescence detector 9 detects fluorescence from the fluorescent dye inserted into each component on a downstream side of the electrophoresis flow channel 11.

Specifically, the fluorescence detector 9 includes a light emitting section that emits excitation light into the electrophoresis flow channel 11 and a light receiving section that receives fluorescence from the electrophoresis flow channel 11 (both of the light emitting section and the light receiving section are not shown). Each component in the sample electrophoresed in the electrophoresis flow channel 11 is marked with a fluorescent dye. Accordingly, each component in the sample emits fluorescence by being excited by excitation light from the light emitting section, and the fluorescence is received by the light receiving section. In this manner, each component in the sample is detected.

When an analysis is finished, a cleaning solution, such as water, is introduced into the electrophoresis flow channel 11, so that a polymer and a sample in the electrophoresis flow channel 11 are washed away and the inside of the electrophoresis flow channel 11 is cleaned. In this manner, a component adsorbed in the inside of the electrophoresis flow channel 11 can be removed. However, a fluorescent dye included in the polymer for separation and a component in the sample into which the fluorescent dye is inserted may remain in the electrophoresis flow channel 11 after the cleaning.

In view of the above, in the present embodiment, the polymer for cleaning contained in the polymer containing section 52 can be introduced into the electrophoresis flow channel 11 instead of the polymer for separation contained in the polymer containing section 51, at a timing other than that of analysis. That is, by switching the valve 4 and driving the pump 3, the polymer for cleaning not including a fluorescent dye is introduced into the electrophoresis flow channel 11 from the polymer containing section 52. With a voltage applied to the electrophoresis flow channel 11 filled with the polymer, a fluorescent dye in the electrophoresis flow channel 11 is removed from the inside of the electrophoresis flow channel 11 by the polymer.

More specifically, a cleaning mode for cleaning the electrophoresis flow channel 11 by using the polymer for cleaning can be executed, in addition to an analysis mode for performing an analysis by using the polymer for separation. The cleaning mode may be executed at any timing by an operator operating an operation section (not shown), or at a timing set in advance, such as at the end of each analysis, at the end of a certain number of analyses, after a certain period of time elapses, or when the power is turned on.

By executing the cleaning mode, a fluorescent dye accumulated in the electrophoresis flow channel 11 can be removed by the polymer not including a fluorescent dye introduced into the electrophoresis flow channel 11. That is, a fluorescent dye accumulated in the electrophoresis flow channel 11 can be removed from the inside of the electrophoresis flow channel 11 by being adhered to the polymer having a certain viscosity. In this manner, the separation performance of the microchip 1 can be recovered effectively as compared to the configuration where the inside of the electrophoresis flow channel 11 is cleaned merely with a cleaning solution such as water.

Figure 2:
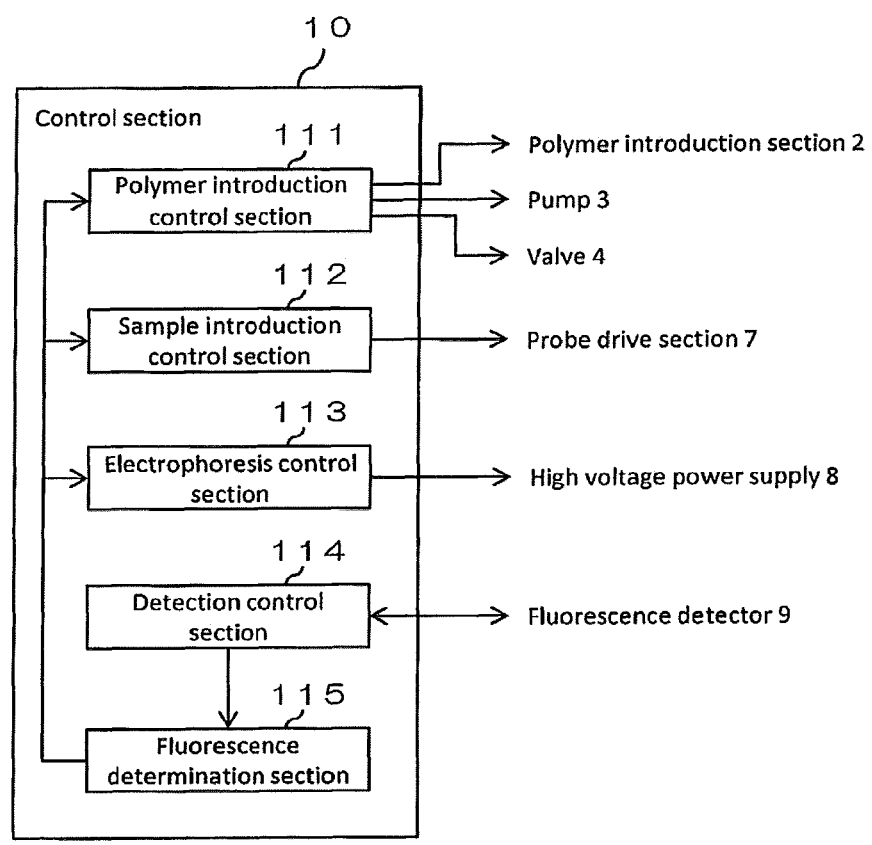
FIG. 2 is a block diagram showing a configuration example of a control section.

FIG. 2 is a block diagram showing a configuration example of a control section 10. Operation of the electrophoresis device according to the present embodiment is controlled by the control section 10 including, for example, a central processing unit (CPU). The control section 10 functions as a polymer introduction control section 111, a sample introduction control section 112, an electrophoresis control section 113, a detection control section 114, and a fluorescence determination section 115 as the CPU executes a program.

The polymer introduction control section 111 controls operation of the polymer introduction section 2, the pump 3, and the valve 4 to introduce a polymer from either one of the polymer containing sections 51 and 52 into the electrophoresis flow channel 11. That is, the polymer introduction control section 111 controls the polymer for separation to be introduced into the electrophoresis flow channel 11 from the polymer containing section 51 in the analysis mode, and the polymer for cleaning to be introduced into the electrophoresis flow channel 11 from the polymer containing section 52 in the cleaning mode. In this manner, the electrophoresis flow channel 11 can be filled with a polymer including a fluorescent dye in the analysis mode, while a polymer not including a fluorescent dye can be introduced into the electrophoresis flow channel 11 in the cleaning mode.

The sample introduction control section 112 controls operation of the probe drive section 7 to introduce a sample into the electrophoresis flow channel 11. That is, in the analysis mode, the sample is introduced from the probe 6 into the electrophoresis flow channel 11 filled with a polymer including a fluorescent dye by the control performed by the sample introduction control section 112. In the present embodiment, in the cleaning mode as well, the sample can be introduced from the probe 6 into the electrophoresis flow channel 11 filled with a polymer not including a fluorescent dye by the control performed by the sample introduction control section 112.

The electrophoresis control section 113 controls a voltage applied from the high voltage power supply 8 to the microchip 1 so as to electrophorese a sample in the electrophoresis flow channel 11. That is, with a voltage applied between the inflow port 12 side and the outflow port 13 side of the electrophoresis flow channel 11 into which the sample is introduced, the sample is electrophoresed in the electrophoresis flow channel 11 from the inflow port 12 side to the outflow port 13 side. In the cleaning mode, with a voltage applied by the electrophoresis control section 113 to the electrophoresis flow channel 11 filled with a polymer not including a fluorescent dye, a fluorescent dye in the electrophoresis flow channel 11 can be removed by the polymer.

The detection control section 114 controls operation of the fluorescence detector 9 to cause the fluorescence detector 9 to emit excitation light into the electrophoresis flow channel 11 to make a sample fluorescent, and receive a detection signal of fluorescence from the sample. In this manner, an amount of fluorescence of the sample can be detected based on the detection signal from the fluorescence detector 9. The detection control section 114 and the fluorescence detector 9 constitute a fluorescence detection section that detects fluorescence from a sample.

In the analysis mode, a sample is introduced into the electrophoresis flow channel 11 and electrophoresed in a state where the electrophoresis flow channel 11 is filled with a polymer including a fluorescent dye. Accordingly, each component in the sample separated by electrophoresis is marked with a fluorescent dye, and fluorescence from the marked component is detected by the detection control section 114. In this manner, each component in the sample is detected.

On the other hand, in the cleaning mode, a sample is introduced into the electrophoresis flow channel 11 and electrophoresed in a state where the electrophoresis flow channel 11 is filled with a polymer not including a fluorescent dye. At this time, if a fluorescent dye still remains in the electrophoresis flow channel 11, the fluorescent dye is inserted into a component in the sample introduced into the electrophoresis flow channel 11 and the component is marked. Accordingly, the detection control section 114 detects fluorescence from the sample, whereby existence of the fluorescent dye in the electrophoresis flow channel 11 can be confirmed. In this manner, whether or not a fluorescent dye still remains in the electrophoresis flow channel 11 can be easily checked.

In the present embodiment, the fluorescence determination section 115 performs processing of comparing an amount of fluorescence detected by the detection control section 114 with a threshold value in the cleaning mode. In this manner, whether or not a certain amount or more of a fluorescent dye exists in the electrophoresis flow channel 11 can be checked. When the fluorescence determination section 115 determines that the amount of fluorescence is larger than or equal to the threshold value, processing performed by the polymer introduction control section 111, the sample introduction control section 112, and the electrophoresis control section 113 is repeated until the amount of fluorescence is determined to be smaller than the threshold value.

That is, the electrophoresis flow channel 11 is filled again with a polymer not including a fluorescent dye, and then operation of introducing a sample into the electrophoresis flow channel 11 and electrophoresing the sample is repeated. In this manner, the polymer not including a fluorescent dye is repeatedly introduced into the electrophoresis flow channel 11 until an amount of the fluorescent dye existing in the electrophoresis flow channel 11 becomes smaller than the certain amount. Accordingly, a fluorescent dye can be favorably removed from the electrophoresis flow channel 11.

Figure 3:
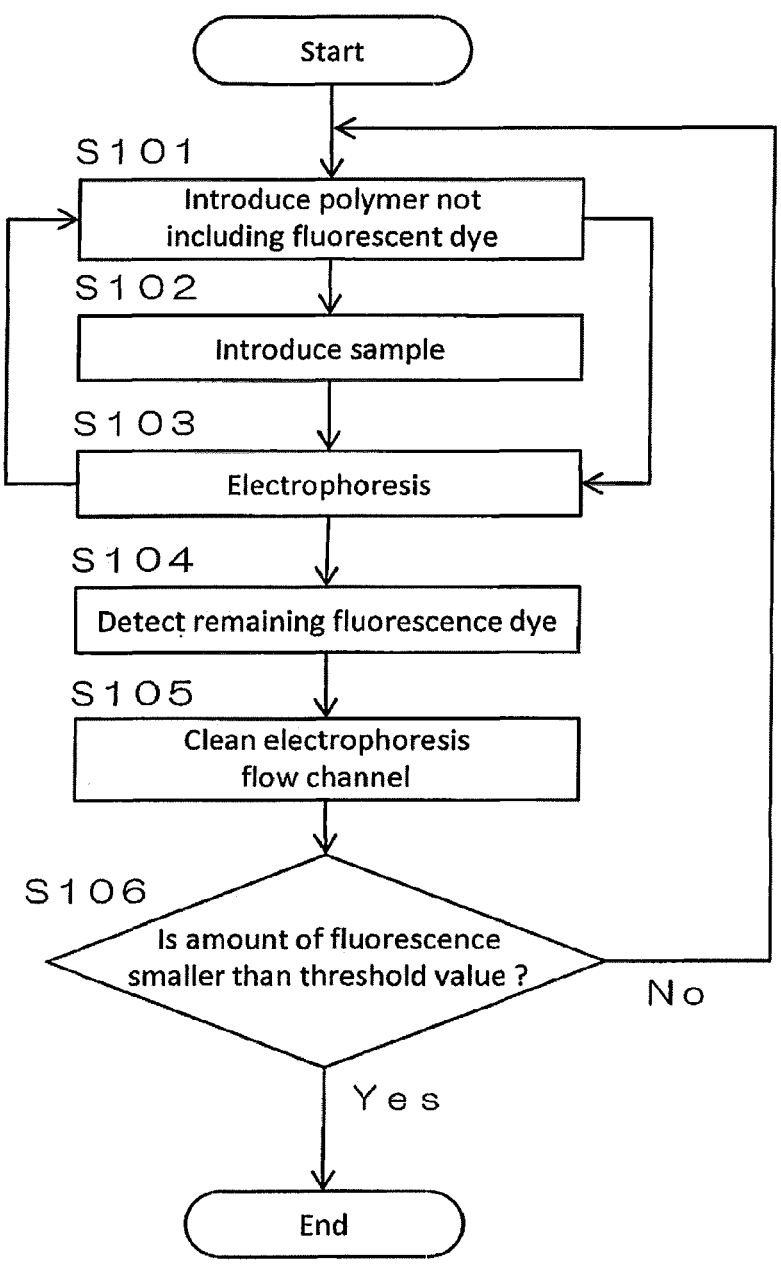
FIG. 3 is a flowchart showing an example of processing performed by the control section in a cleaning mode.

FIG. 3 is a flowchart showing an example of processing performed by the control section 10 in the cleaning mode. In the cleaning mode, the polymer introduction control section 111 first controls the polymer introduction section 2, the pump 3, and the valve 4, so that a polymer not including a fluorescent dye is introduced into the electrophoresis flow channel 11 from the polymer containing section 52 (Step S101: polymer introduction step).

In this manner, the electrophoresis flow channel 11 becomes in a state of being filled with the polymer not including a fluorescent dye. The sample introduction control section 112 controls the probe drive section 7 to introduce a sample into the electrophoresis flow channel 11 filled with the polymer (Step S102: sample introduction step). At this time, the electrophoresis control section 113 controls the high voltage power supply 8 to apply a voltage to the electrophoresis flow channel 11 into which the sample is introduced, and the sample is electrophoresed in the electrophoresis flow channel 11 (Step S103: electrophoresis step).

During the electrophoresis of the sample in the electrophoresis flow channel 11, the detection control section 114 detects fluorescence from the sample based on a detection signal from the fluorescence detector 9. In this manner, a fluorescent dye that remains in the electrophoresis flow channel 11 is detected (Step S104: fluorescence detection step). After the sample is electrophoresed for a certain period of time (for example, around one minute) as described above, a cleaning solution such as water is introduced into the electrophoresis flow channel 11. In this manner, the polymer and the sample in the electrophoresis flow channel 11 are washed away, and the electrophoresis flow channel 11 is cleaned (Step S105: cleaning step).

By washing away the polymer in the electrophoresis flow channel 11 as described above, a fluorescent dye accumulated in the electrophoresis flow channel 11 can be adhered to the polymer and removed from the electrophoresis flow channel 11. Thereafter, an amount of the fluorescence detected in Step S104 is compared with the threshold value (Step S106: fluorescence determination step). If the amount of the fluorescence is smaller than the threshold value (Yes in Step S106), the cleaning mode is finished without proceeding further.

On the other hand, if the amount of the fluorescence is larger than or equal to the threshold value (No in Step 106), the processing of Steps S101 to S105 is executed again. By repeating the processing of Step S101 to S105 until the amount of the fluorescence is determined to be smaller than the threshold value (until Yes is determined in Step S106) as described above, an amount of a fluorescent dye in the electrophoresis flow channel 11 is gradually reduced. At the time point at which the amount of the fluorescence becomes smaller than the threshold value (Yes in Step S106), the cleaning mode is finished.

However, the present invention is not limited to the configuration in which Steps S101 to S106 of FIG. 3 are executed automatically by the cleaning mode, and may employ a configuration in which at least one of Steps S101 to S106 is executed individually by operation of an operator. The configuration may also be such that at least one of Steps S101 to S106 is executed by an operator manually.

The present invention is not limited to the configuration in which the processing of Steps S101 to S105 is repeated until the amount of the fluorescence is determined to be smaller than the threshold value (until Yes is determined in Step S106), and may employ a configuration in which the processing is repeated a predetermined number of times. The predetermined number of times may be a certain number of times, or set optionally by the user.

The present invention is not limited to the configuration in which the processing of Steps S101 to S105 is repeated. The configuration may be such that electrophoresis in Step S103 is performed for a long period of time, and, during the electrophoresis, fluorescence is detected by the fluorescence detector 9 and whether or not an amount of detected fluorescence is smaller than a threshold value is monitored. In this case, the electrophoresis may be finished at the time point at which the amount of the detected fluorescence is determined to be smaller than the threshold value, and the inside of the electrophoresis flow channel 11 may be cleaned.

In the above embodiment, the description has been made on the case where the present invention is applied to the microchip electrophoresis device including the microchip 1. However, the present invention can also be applied to an electrophoresis device other than the microchip electrophoresis device, such as an electrophoresis device including a capillary tube.

What is claimed is:

1. A method to control an electrophoresis device, comprising:
introducing a polymer not including a fluorescent dye into an electrophoresis flow channel after at least one electrophoresis using the fluorescent dye such that the polymer fills the electrophoresis flow channel;
introducing, into the electrophoresis flow channel filled with the polymer, a sample including a component into which the at least one electrophoresis causes the fluorescent dye to be inserted;
applying a voltage to the electrophoresis flow channel filled with the polymer and the sample such that the fluorescent dye accumulated in the electrophoresis flow channel from the at least one electrophoresis using the fluorescent dye is inserted into the component in the sample;
detecting fluorescence from the sample electrophoresed by the applying of the voltage to the electrophoresis flow channel filled with the polymer and the sample;
comparing an amount of the fluorescence detected with a threshold value set to determine that the fluorescent dye is removed from the electrophoresis flow channel sufficiently for an analysis mode;
filling the electrophoresis flow channel with a polymer including the fluorescent dye after the amount of the fluorescence becomes smaller than the threshold value;
introducing a sample for an analysis into the electrophoresis flow channel filled with the polymer including the fluorescent dye;
applying a voltage to the electrophoresis flow channel filled with the sample for the analysis and the polymer including the fluorescent dye such that the sample for the analysis is electrophoresed in the electrophoresis flow channel and a component in the sample for the analysis is separated; and
detecting the component in the sample for the analysis marked by the fluorescent dye,
wherein the introducing of the polymer not including the fluorescent dye, the introducing of the sample, and the applying of the voltage to the electrophoresis flow channel filled with the polymer not including the fluorescent dye and the sample are repeated until the amount of the fluorescence is determined to be smaller than the threshold value.

2. The method according to claim 1, wherein the polymer including the fluorescent dye comprises a polymer material that is same as a polymer material of the polymer not including the fluorescent dye in the at least one electrophoresis.

3. The method according to claim 2, further comprising:
introducing a cleaning solution into the electrophoresis flow channel after the detecting of the fluorescence such that the polymer not including the fluorescent dye and the sample are washed away from the electrophoresis flow channel.

4. The method according to claim 2, further comprising:
setting a number of times for which the introducing of the polymer, the introducing of the sample and the applying of the voltage are repeated.

5. The method according to claim 2, wherein each of the polymer including the fluorescent dye and the polymer not including the fluorescent dye is a derivatized cellulose.

6. The method according to claim 2, wherein the sample is a biopolymer having a purity of 90% or higher, and the polymer including the fluorescent dye is a derivatized cellulose.

7. The method according to claim 2, wherein the electrophoresis causes the fluorescent dye of the polymer including the fluorescent dye to be inserted into the component.

8. The method according to claim 1, wherein the electrophoresis flow channel is formed in a microchip.

9. The method according to claim 8, further comprising:
introducing a cleaning solution into the electrophoresis flow channel after the detecting of the fluorescence such that the polymer not including the fluorescent dye and the sample are washed away from the electrophoresis flow channel.

10. The method according to claim 8, wherein the polymer including the fluorescent dye and the polymer not including the fluorescent dye are a derivatized cellulose.

11. The method according to claim 8, wherein the electrophoresis causes the fluorescent dye of the polymer including the fluorescent dye to be inserted into the component.

12. The method according to claim 1, further comprising:
introducing a cleaning solution into the electrophoresis flow channel after the detecting of the fluorescence such that the polymer not including the fluorescent dye is washed away from the electrophoresis flow channel.

13. The method according to claim 12, wherein the electrophoresis causes the fluorescent dye of the polymer including the fluorescent dye to be inserted into the component.

14. The method according to claim 1, further comprising:
setting a number of times for which the introducing of the polymer, the introducing of the sample and the applying of the voltage are repeated.

15. The method according to claim 1, wherein the sample is a biopolymer having a purity of 90% or higher.

16. The method according to claim 15, wherein the electrophoresis causes the fluorescent dye of the polymer including the fluorescent dye to be inserted into the component.

17. The method according to claim 1, wherein the polymer including the fluorescent dye is a derivatized cellulose.

18. The method according to claim 17, wherein the electrophoresis causes the fluorescent dye of the polymer including the fluorescent dye to be inserted into the component.

19. The method according to claim 1, wherein the electrophoresis causes the fluorescent dye of the polymer including the fluorescent dye to be inserted into the component.

* * * * *